United States Patent [19]
Yoshimura et al.

[11] Patent Number: 5,574,846
[45] Date of Patent: Nov. 12, 1996

[54] CARD WINDOWING METAPHOR FOR APPLICATION COMMAND AND PRESENTATION HISTORY

[75] Inventors: Tetsuya Yoshimura; Hirotada Ueda; Yutaka Hidai; Masashi Uyama, all of Tokyo, Japan

[73] Assignee: New Media Development Association, Tokyo, Japan

[21] Appl. No.: 452,962

[22] Filed: May 30, 1995

Related U.S. Application Data

[63] Continuation of Ser. No. 911,732, Jul. 10, 1992, abandoned.

[30] Foreign Application Priority Data

Jul. 15, 1991 [JP] Japan .................................. 3-174023

[51] Int. Cl.[6] .................................................. G06F 11/32
[52] U.S. Cl. ............................................................ 395/118
[58] Field of Search ........................... 395/122, 152–154, 395/157, 161; 364/578

[56] References Cited

U.S. PATENT DOCUMENTS

| | | | |
|---|---|---|---|
| 4,885,717 | 12/1989 | Beck et al. ............................. | 395/775 |
| 5,075,847 | 12/1991 | Fromme ................................. | 395/700 |
| 5,121,475 | 6/1992 | Child et al. ............................ | 395/153 |
| 5,148,154 | 9/1992 | MacKay et al. .................... | 395/154 X |
| 5,159,669 | 10/1992 | Trigg et al. ............................ | 395/159 |
| 5,191,646 | 3/1993 | Naito et al. ............................ | 395/161 |
| 5,210,859 | 5/1993 | Aoshima et al. .................. | 395/183.22 |
| 5,228,123 | 7/1993 | Heckel .................................... | 395/155 |
| 5,228,137 | 7/1993 | Kleinerman et al. ................. | 395/500 |
| 5,237,648 | 8/1993 | Mills et al. ......................... | 395/152 X |
| 5,283,864 | 2/1994 | Knowlton ............................ | 395/161 X |
| 5,291,593 | 3/1994 | Abraham et al. .................. | 395/157 X |
| 5,297,248 | 3/1994 | Clark .................................. | 395/161 X |

OTHER PUBLICATIONS

Borland, Turbo Debugger 2.0 User's Guide, 1990, pp. 75–93.
Goodman, The Complete Hypercard Handbook, 1987, pp. 20–27, 32–33, 46–47, 356–357, 392–393, 407–413.
O'Brien, Turbo in a Suit, EXE, Mar. 1991, pp. 33–36.
Myers et al., Automatic Data Visualization for Novice Pascal Programmers, Visual Languages, 1988 IEEE Workshop, 1988, pp. 192–198.

(List continued on next page.)

*Primary Examiner*—Heather R. Herndon
*Assistant Examiner*—Anton W. Fetting
*Attorney, Agent, or Firm*—Armstrong, Westerman, Hattori, McLeland & Naughton

[57] ABSTRACT

An information processor, which manages operational history data or status data to revert an application back to any desired point in the past or make use of the past operations, includes an interface screen having cards thereon, as objects, that are manipulated by a user so as to make use of history. Contents of the history are represented while the order of the cards, placed one upon another, is associated with the time series of the history. A card representation is provided on the screen presented by the application to the user at any point in a past or to provide a card representation defined by images which alternately display screen representations before and after a change in the application screen by the operation performed by the user at any point in the past, while the before-change and after-change representations are displayed for different periods of time. A tag provided to the card is incorporated in the interface screen and objects of stacks, where a bundle of cards arranged according to the time series of the card history is placed and to which instructions as to a user's operation performed on the card bundle are inputted, are incorporated on the user's interface screen. The stack cooperates with the application by letting the application execute an operational history corresponding to a card sequence on the stack and letting the results be represented on the cards; and the card sequence is inserted into the stack in conjunction with the application; thereby, letting the application execute the operational history.

9 Claims, 17 Drawing Sheets

OTHER PUBLICATIONS

Kurlander, D. and S. Feiner; "Editable Graphical Histories", 1988 IEEE Workshop on Visual Languages (Pittsburgh, PA); pp. 127–134.

Kurlander, D. and S. Feiner; "Editable Graphical Histories: The Video", 1991 Computer–Human Interaction Conference (New Orleans, LA), pp. 451–452.

Dannenberg, R. B.; "A Structure for Efficient Update, Incremental Redisplay and Undo in Graphical Editors", *Software Practice & Experience,* vol. 20, No. 2, Feb. 1990; pp. 109–132.

Styne, B. A.; "Command History in a Reversible Painting System", Computer Animation '90, (Geneva, Switzerland); pp. 149–164.

FIG. 2(a)
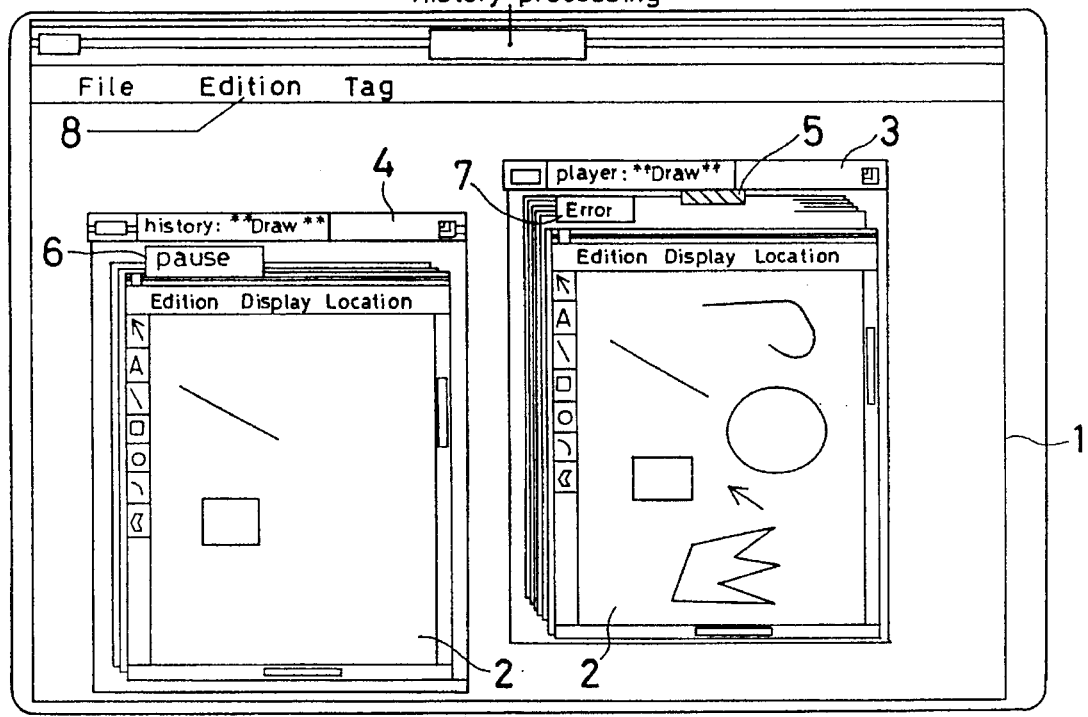
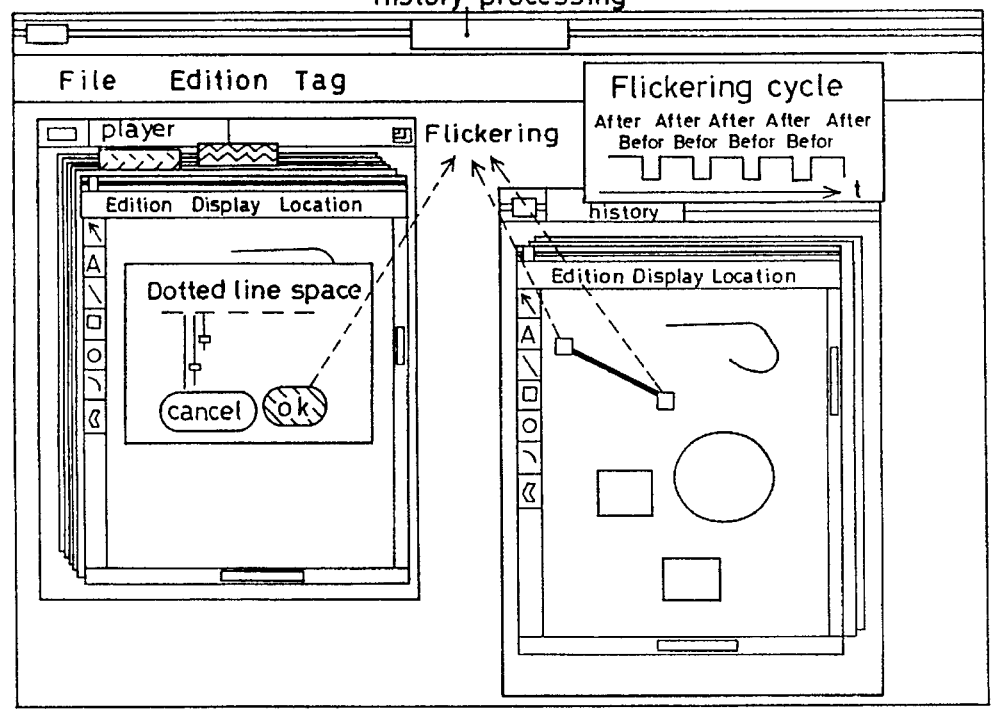
FIG. 2(b)

FIG. 4(f) ← Card copying

Changing of file name

Changing of file name

CARD WINDOWING METAPHOR FOR APPLICATION COMMAND AND PRESENTATION HISTORY

This application is a continuation of application Ser. No. 07/911,732 filed Jul. 10, 1992, now abandoned.

BACKGROUND OF THE INVENTION

The present invention-relates to a history content representation system for information processors, which incorporates editing functions and enables operational histories to be managed in order to revert applications back to any desired point in the past or make effective use of past operations.

So far, systems creating a character string of programs or data or documents, patterns, images or sounds have incorporated editing functions for shift, insertion, deletion, substitution, and so on. For making effective use of the past operations done by users or reverting current applications back to any point in the past in using these editing capabilities, undo/redo and history functions have been used in the art. These are designed to revert patterns back to any desired point in the past or to output the command sequence the user typed in a history list format, enabling the user to reexecute any desired one of the commands for reuse.

For instance, one examplary system so far designed as graphical user interfaces is diagrammatically illustrated in FIG. 1. This system is designed so as to be capable of making use of the history of edited text.

As shown in FIG. 1A, a text history data block 51 incorporates the function capable of managing the history data of edited text and, for instance, has such internal data as mentioned below:

> Insertion "Line (0,0)–(10,10)"
> Deletion "Circle (Center: 5,5; Radius: 3)"
> . . .
> . . .

A text-processing block 52 incorporates the function of creating, deleting and has otherwise processing text and, for instance, internal data regarding text such as the one mentioned below:

Insertion "Line (0,0)–(10,10)"

Deletion "Circle (Center: 5,5; Radius: 3)"

A control block 53 incorporates the function of interpreting and executing user's operations, displaying the results of execution, and so on.

When making use of operational history with the system mentioned above, the user issues instructions in order to output a history list, and the application side responds to them, displaying the results of execution, as typically shown in FIG. 1B, and giving the following history list in a character string:

> 1. Insertion "Circle (Center: 10,10; Radius: 3)"
> 2. Insertion "Circle (Center: 20,10; Radius: 3)"
> 3. Insertion "Circle (Center: 20,20; Radius: 3)"
> 4. . . .
> 5. . . .
> 6. . . .
> 7. Insertion "Character" Element: A""
> . . .
> 12. Insertion "Character" Element: F"".

Then, as the user types "Reexecution 1", the application according responds and executes the following 1. Insertion "Circle (Center: 10,10; Radius: 3)" of the operational history. In order to correct an error and redo the application, the user issues the revert command before one point of time. The application side accordingly responds and executes the following:

Deletion "Character" Element: F"from the latest operation of the operational history 12 Insertion "Character" Element: F", and adding to the operational history 13. Deletion "Character" Element: F".

By repeatedly issuing the revert commands before one point of time in the manner mentioned above, the user reverts the application back to where errors have occurred. In order to re-do the application, the user selects pertinent operation from a character string of the operational history and executes it or, in the alternative, the user retype commands.

In the conventional systems, however, correcting a part of the past has to be achieved by reverting the application back to where correction and redoing is required that is, the user has to perform the same operations. A problem with displaying the operational history list, as shown in FIG. 1B, is that it is awkward to the user, because the user must discriminate the operations on the screen presenting the user with the results of execution by making comparisons between the history list and the results of execution. Another problem is that it is unable to edit a plurality of command histories.

What is required for reusing operational history or reverting an application back to any point in the past is a method of presenting the user with history, which is easy not only to understand but to operate as well. However, conventional applications incorporating graphical interfaces (such as, depicting applications) teach nothing as to how to effectively present users with the contents of history.

SUMMARY OF THE INVENTION

An object of the invention is to build a user interface which makes it easy for a user to understand and handle the histories of applications and operations done by the user, both stored in a computer.

In order to accomplish the object mentioned above, the invention provides a history representation system for information processors, which manages operational history data or status data in order to revert an application back to any desired point in the past or make use of the past operations. The system includes an interface screen having cards as objects which are manipulated by the user to make use of the history, and the contents of the history is represented, while the order of the cards being stacked up is associated with the time series of the history.

Preferably, a card is represented on the screen which was presented by the application to the user at any point of time in the past.

Preferably, the screen, in order to provide a card representation is defined by images which alternately display screen representations before and after a change in the application screen by the operation performed by the user at any point in the past, and the before-change representation differs from the after-change representation in terms of the length of time.

Preferably, a tag to be provided to the card is incorporated in the interface screen. Preferably, an object of a stack, which is a location where a bundle of cards arranged according to the time series of the card history is placed and to which instructions as to an user's operation performed on the card bundle are inputted, is incorporated on the user's interface screen. The stack which cooperates with the application allows the application to execute an operational history corresponding to a card sequence on the stack and the results represented on the cards. The card sequence is inserted into the stack cooperative with the application, thereby letting the application execute the operational history. Preferably, a tag is provided for pausing the execution of the operational history corresponding to the card, and an additional tag is provided for pausing the execution of the operational history with the card corresponding to the point of time at which an error or a warning message is sent from the application, indicating that there has been a message output from the application.

According to another aspect of this invention, there is provided a history content representation system for information processors, which manages operational history data or status data to revert an application back to any desired point in the past or make use of the past operations. The system includes:

a card type interface block for interpreting a user's operation to control each block, holding card representation data corresponding to the history and managing what is displayed on the screen, a status data management block for managing the status data required for reverting the application back to any point in the past, an operational history management block for managing a user's operational history data, and an application block which operates according to the user's operation inputted through the card type interface block and the operational data from the operational history management block and outputting an image representation after operation to the card type interface block, the interface screen of the interface block having cards as object which are manipulated by the user to make use of the history, and the contents of the history being represented, while the order of the cards being put one upon another is associated with the time series of the history.

According to the present invention, as discussed above, the card corresponding to a history at each point in time is represented on the interface screen so that the computer can present the user with history data through an image representation that the user saw in the past, while allowing the user to drag or otherwise move the card with the mouse, and giving the computer instructions as to how the history data is processed. In addition, in what order the operational history is reused can be indicated by editing the order of the cards being put one upon another; and by selecting the cards, it is possible to give the computer instructions on to what point in the past the application is reverted back. The card representation, when undergoing a change, flickers. This flickering area can teach the user what change was induced in the application representation by the past operation, and the states before and after that change can be discriminated by a difference in flickering time.

By locating the bundle of cards arranged according to the time series of history within the stack, order is created on the interface screen, thereby making it easy for the user to have an understanding of the contents of what is displayed on the interface screen; and by defining operating a plurality of card bundles as being tantamount to operating the stack, the user's operation on the card bundles is made easy. By stacking cards corresponding to operational history with respect to the stack in operative association with the application, the contents of operations contained in the operational history can be easily provided to the application.

Furthermore, since the card is provided with a tag, it is easy to draw a particular card from the card bundle. It is also possible to pause the execution of the operational history corresponding to the tagged card or pause the application so as to have the user confirm on whether or not the application is to be continued. This pausing makes it possible to input an operation different from the operational history to be reused in the course of inputting the operational history to the application, or enables the user to confirm a message from the application and perform pertinent input operation on the application.

Additional objects and advantages of the invention will be apparent from the specification.

BRIEF DESCRIPTION OF THE DRAWINGS

FIG. 1A is a block diagram of a conventional system, while and FIG. 1B shows a screen displaying the results of execution presented by this system and a screen representing an operation history list.

FIG. 2A through FIG. 2E are shown to explain an embodiment of a history content representation system according to the present invention. FIG. 2A shows a user interface screen (for restoring the status of application to the status in the past or for utilizing history to reutilize the operation inputted by the user in the past); FIG. 2B represents a screen alternately displaying the statuses before and after the operation corresponding to the card is executed to the application; FIG. 2C shows a screen, in which a lower card is pulled out to the side of the piled cards; FIG. 2D represents a screen for inserting and adding operation history by piling up a stack; and FIG. 2E shows an editing screen by moving cards.

FIG. 3A shows a screen for depicting a circle by selecting a circle depicting of a tool box; FIG. 3B represents a screen in order to prepare and arrange duplicate graphics of circle by selecting editing function for duplication; FIG. 3C shows a screen for drawing characters in each circle by selecting character drawing in a tool box; FIG. 3D shows a screen, in which a lower card is pulled out and a card corresponding to the operation to be changed is searched and pulled out in a case where a circle is changed to a rectangle; FIG. 3E shows a screen, in which a selection for a circle drawing is changed to a selection of rectangle drawing and further, a tag is attached; FIG. 3F shows a screen, in which the results of the change of a circle to a rectangle is reflected in an upper card; FIG. 3G shows a screen, in which a card with a tag attached on it is pulled, selection is changed to a selection of drawing of a rectangle with round corners and further, a tag is attached; and FIG. 3H shows a screen representing the results of a change of a rectangle to a rectangle with round corners.

FIG. 4A through FIG. 4L are shown to explain examples for executing the same operation in a plurality of files by utilizing operation history according to the present invention; FIG. 4A shows a screen in which file name is inputted by a key and a "pause" tag is attached by a history window menu; FIG. 4B represents a screen, in which file names are read; FIG. 4C shows a screen in which an underline is selected by a font menu; FIG. 4D shows a screen in which an underline is put to each character; FIG. 4E shows a screen in which the menu "file save" is called; FIG. 4F represents a screen in which the cards from the card with "pause" tag to the foremost card are copied on a history stack; FIG. 4G shows a screen representing a pause by the card with a "pause" tag; FIG. 4H shows a screen in which a file name is changed; FIG. 4I shows a screen in which a file name is erroneously inputted; FIG. 4K shows a screen in which a message of error confirmation is outputted and a message tag has been attached; and FIG. 4L shows a screen in which the card corresponding to the operation erroneously inputted is deleted and a file name is changed.

FIG. 6A shows a direction of flows of information between components of the data processing system; FIG. 6B represents a flow of the processes in which operation data of a user are delivered to an application unit and operation history management unit from the card type interface unit; FIG. 6C shows the flow of processes in which status data of application are delivered from a status data management unit to an application unit; FIG. 6D shows the flow of processes of control instruction, operation history data, display image data and status data in the case operation history is given to an application unit; and FIG. 6E shows the flow of internal processes to an application unit.

DESCRIPTION OF PREFERRED EMBODIMENTS

Figure 1A:
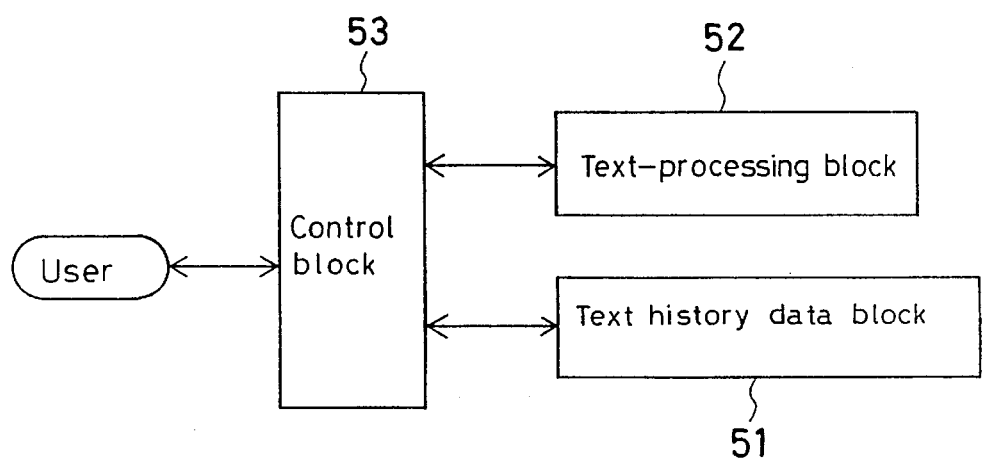
FIG. 1A and FIG. 1B each represents a conventional system in which edit history of editing object can be utilized.

Referring now to FIG. 2A, a history window 1 is a user interface screen for making use of history, thereby enabling the user to revert an application back to any point in the past and reuse the operation input by the user. This interface screen has cards 2 and stacks 3 and 4 as objects which are manipulated by the user to make use of history.

The cards 2 present the user with the contents of history, while the order of the cards being put one upon another is corresponds to time series, one card associated with one operational history. The unit of operational histories is optimized in every application, while taking the user's work into consideration.

The stack 3, to which instructions as to the operation to be performed by the user on a bundle of cards are inputted, incorporates the function of cooperating with an application, letting the application execute an operational history corresponding to a card sequence, and allowing the result to be represented by a card. Thus, the leading card of the stack 3 represents the results of the operation sequence of all the card sequence on the stack, which is given to the application.

The stack 4 is a location where the bundle of cards 2 arranged according to the time series of history is placed. The cards on this stack 4 are copies obtained from the stack 3 and are represented, as in the case where the stack 3 is copied.

For card representation, the states before and after an operation corresponding to the card is given to an application are alternately displayed, as shown in FIG. 2B. Discriminating between the before-states and after-states easily, for instance, is achieved by making the display time of the latter twice as long as that of the former. Accordingly, some flickering area of the card represents a change by the operation and the rest shows the state where the operation has been performed.

Figure 2C:
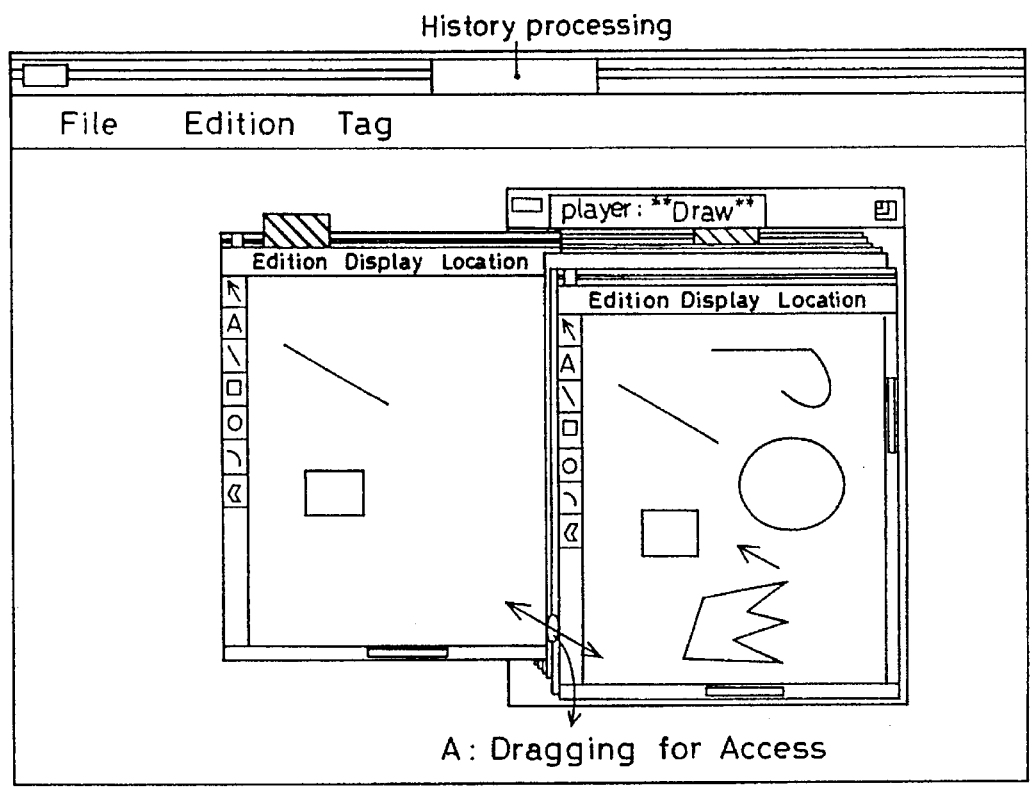

In order to manipulate the card bundle, for instance, a mouse cursor is first located at the edge of the card, as shown in FIG. 2C. Then, the mouse is moved (or otherwise dragged), while pressing the mouse buttons so that the underlying card can be horizontally drawn out of the card stack in association with mouse movements. Accordingly, the user readily sees the underlying card and can thus readily confirm the past state of the application and the past operations.

Because the cards are put up in a bundle, only with the use of the dragging movements mentioned above, many manipulations are needed to find out the desired card from the card bundle and perform another operation on that card. As means for allowing the user to find out the desired card from the card bundle and see it easily, a tag 5 is provided that is movable with the card 2 on the interface screen. As this tag 5 is dragged, the card 2 is moved correspondingly so that the user can easily draw the desired card from the card bundle. This tag 5 may also serve as a pause tag 6 so as to allow the execution of operational history corresponding to the card to be paused. Besides, it may be designed as a message tag 7, which lets the execution of operational history be paused with the card corresponding to the point of time when an error or warning message is produced from the application, indicating that the message has been produced from the application.

Figure 2D:
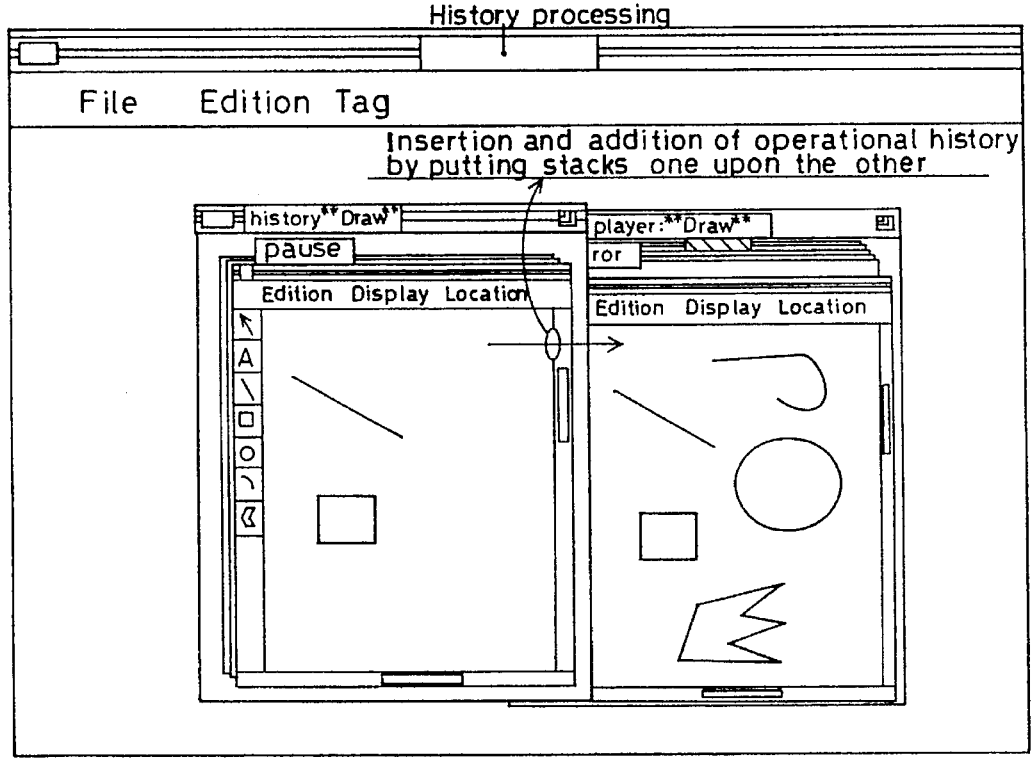
Figure 2E:
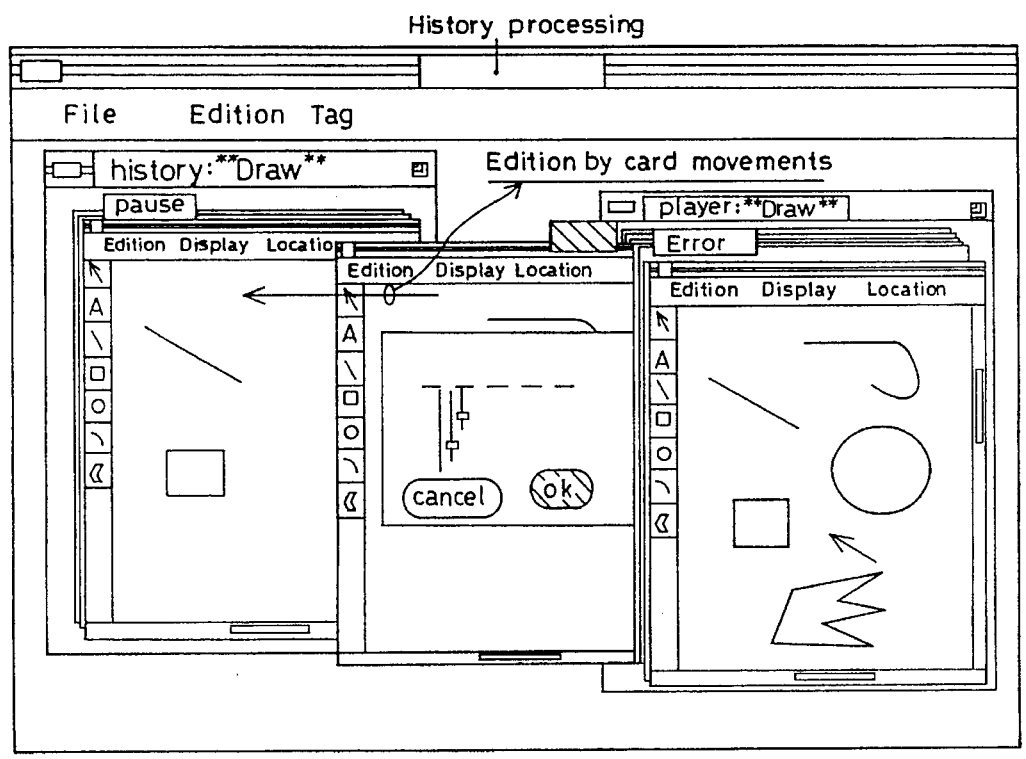

The computer can present the user with operational history data at each point in time by representing the card 2 corresponding to history at each point in time on the interface screen, while the user can move the card 2 with the mouse to give the computer instructions as to what processing is to be performed on the history data. Here, the order in which the cards 2 are put one upon another is defined as in what order the user reuses operational histories. Then, as shown in FIGS. 2D and 2E, it is possible to indicate in what order the user reuses the operational histories by editing how the cards 2 are put one upon another and give the computer instructions as to where to revert the application by offering a selection of the cards 2.

This invention will hereinafter be explained with reference by way of a more specific example of operation.

Figure 3A:
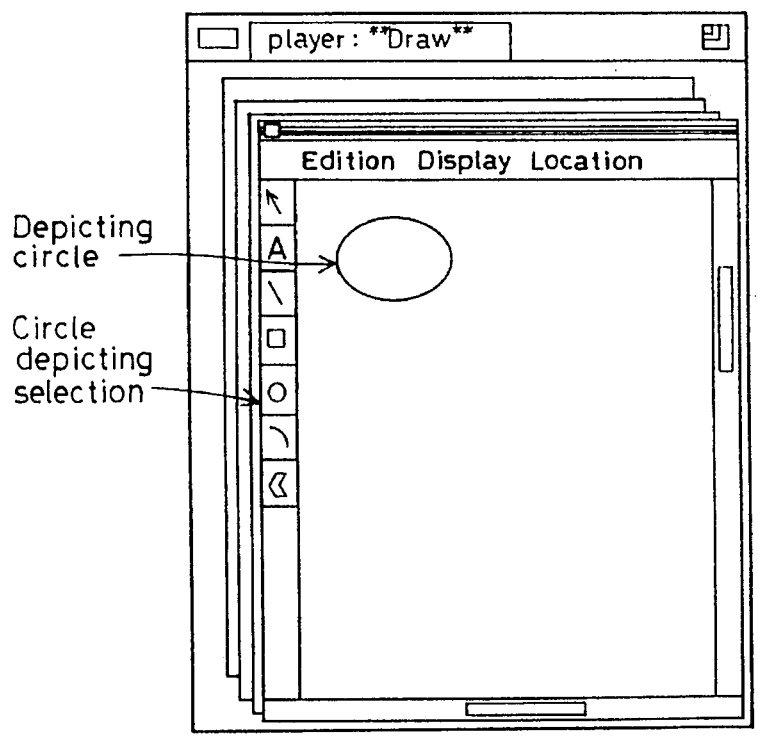
FIG. 3A through FIG. 3H are illustrated to explain examples in a case where operation history is repeatedly used to depict pictures according to the present invention.
Figure 3B:
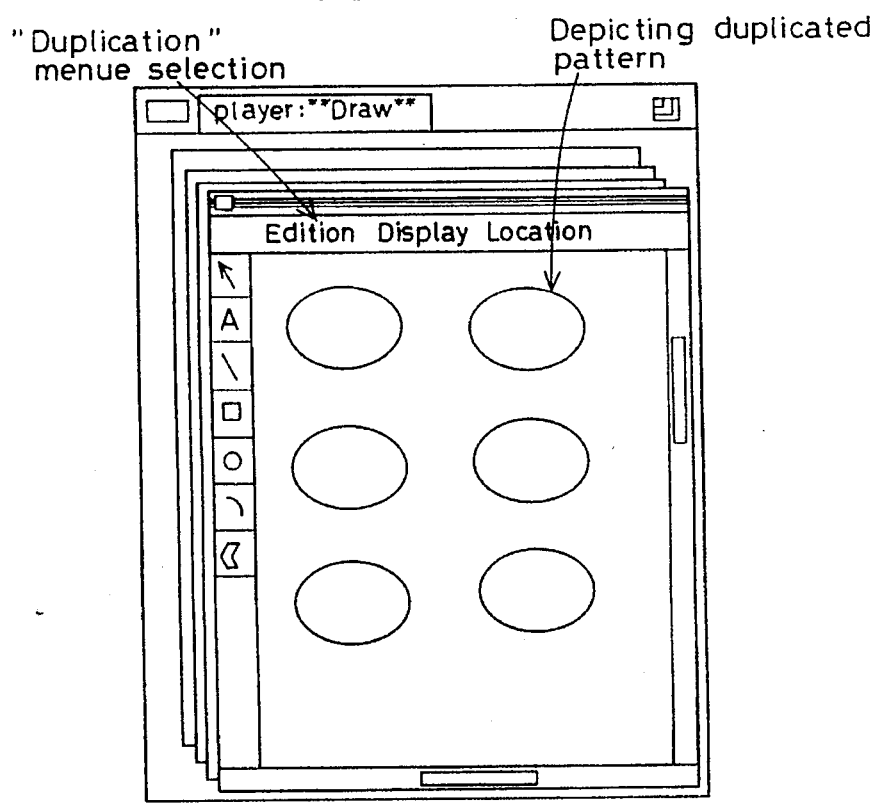
Figure 3C:
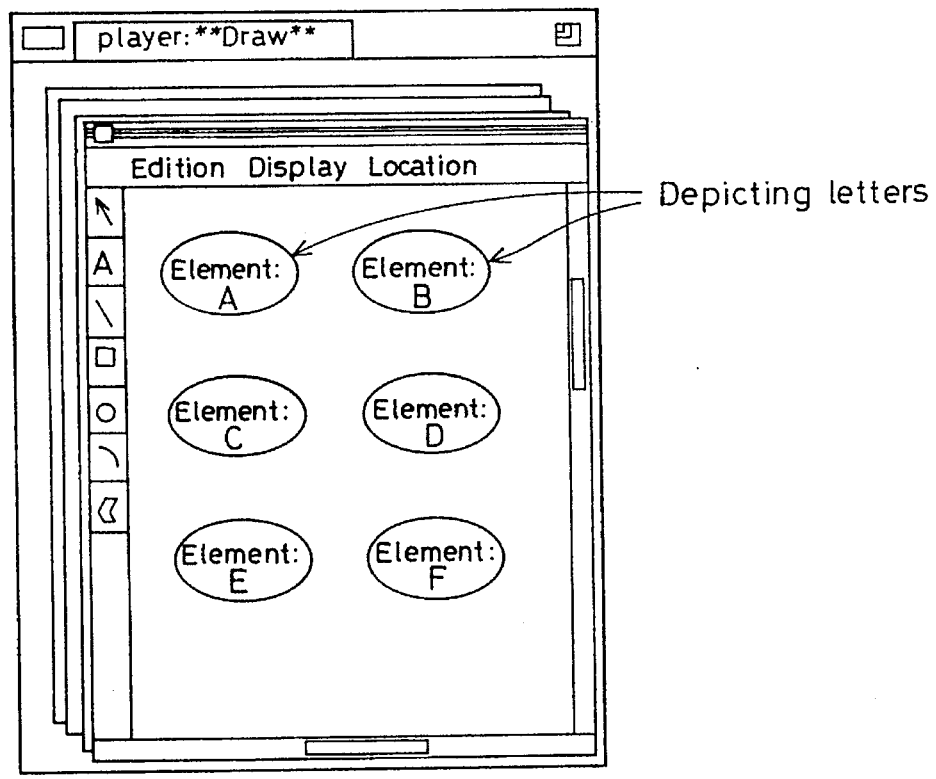

As an example, now consider the case where a circle is depicted for duplication, characters are then entered in each duplicated circle, and each circle is finally transformed to a rectangle with or without round corners for viewing. In this case, for instance, the user manipulates the mouse to select a symbol "" from within a tool box as shown in FIG. 3A, depicting a circle. A card corresponding to these operations is created. Subsequently, the user moves the mouse cursor over "Edition" in a pull-down menu area, as shown in FIG. 3B, and clicks on it to display an edition menu, from which the duplication function is selected to prepare a circle duplicate and locate it in place. Again, a new card is created. Moreover, the user selects a letter "A" from within the tool box, as shown in FIG. 3C, and then types letters "Element: A", "Element: B", . . . in the circles. Still again, a new card is created to form a basic format.

Figure 3D:
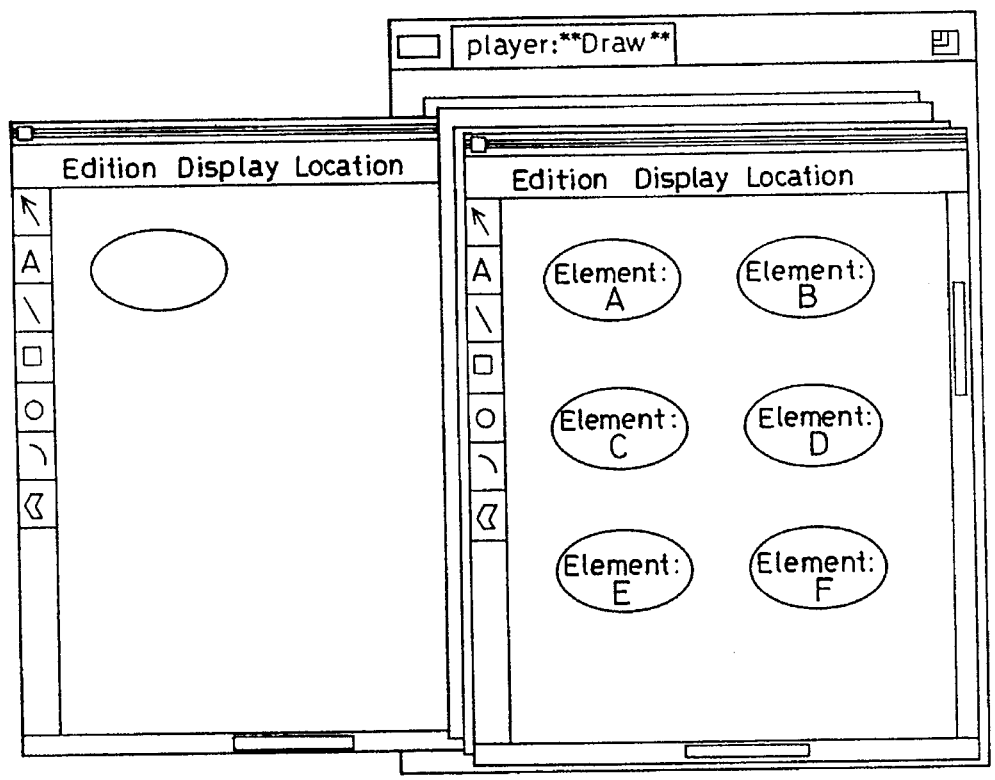
Figure 3E:
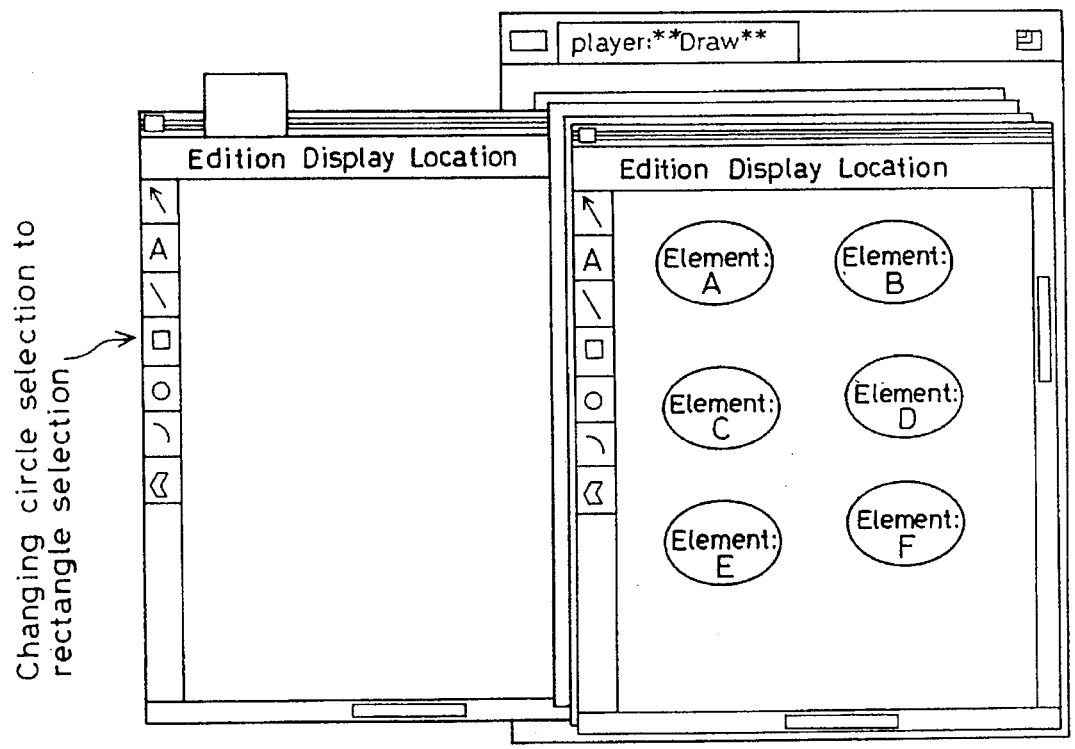
Figure 3F:
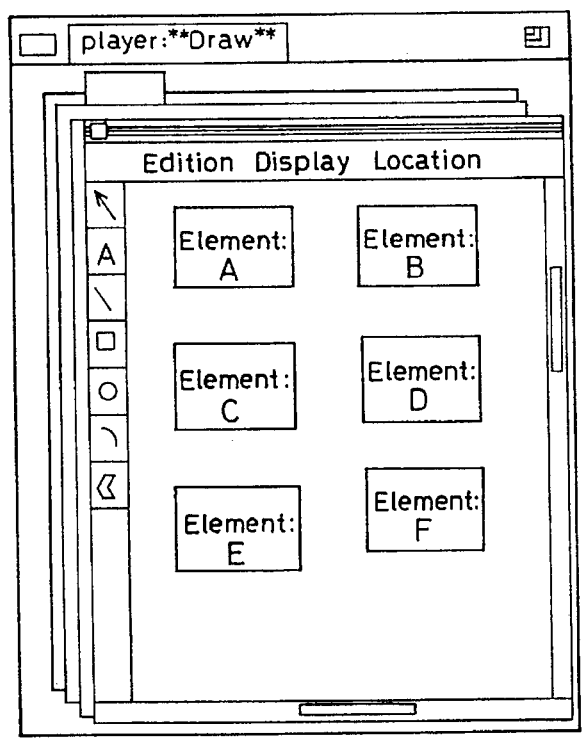

Then, each circle is transformed to a rectangle. To do this, as shown in FIG. 3D, the underlying card is withdrawn to look for a card corresponding to the operation which the user wants to change and the first card which has selected circle being depicted. Subsequently, as shown in FIG. 3E, the circle depicting selection is changed to the rectangle depicting selection, and the card is returned to the original location after tagging. This lets the applications be operatively associated with each other so that the results of having transformed circles to rectangles can be reflected on the overlying card, as shown in FIG. 3F.

Figure 3G:
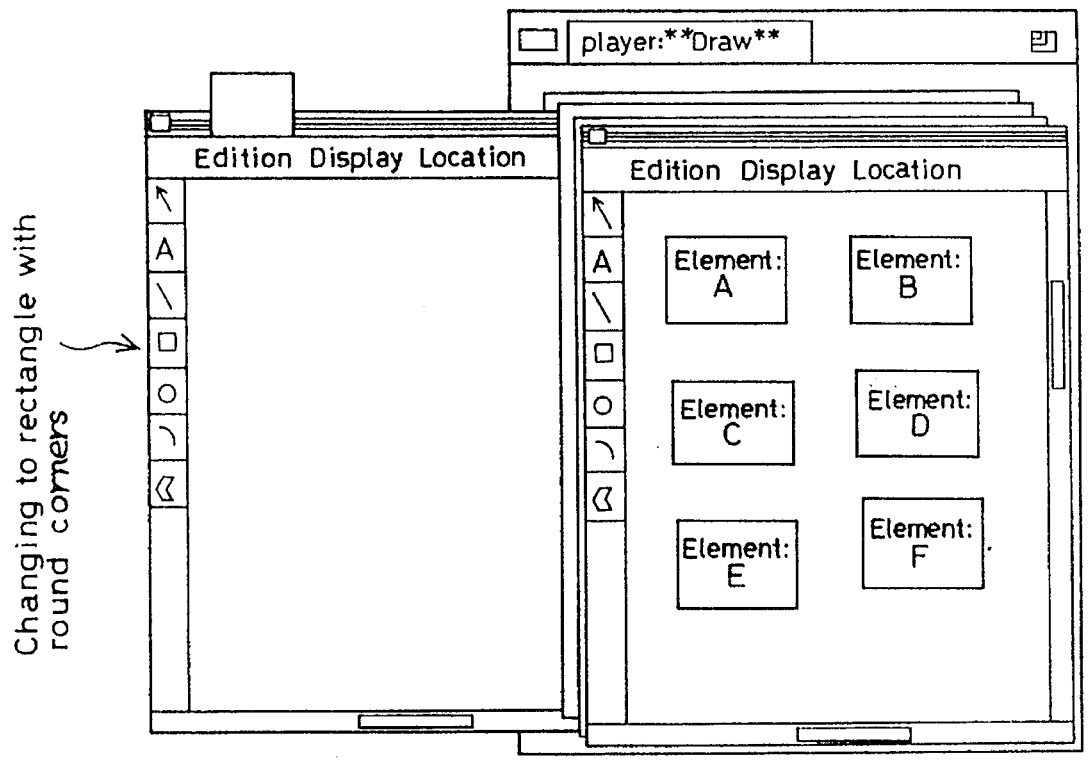
Figure 3H:
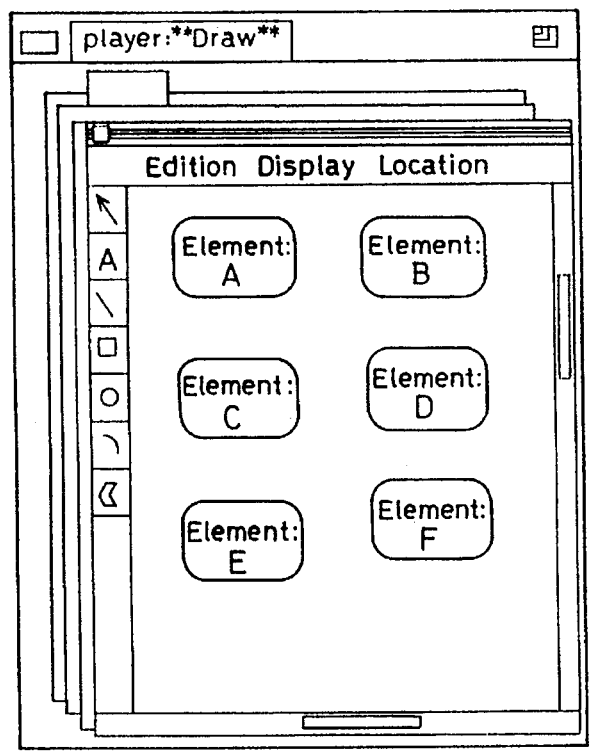

In addition, as shown in FIG. 3G, the tagged card is withdrawn to change the rectangle depicting selection to the rectangle-with-round-corners depicting selection, and is then returned to the original location. Consequenctly, the results of having transformed rectangles into rectangles-with-round-corners can now be reflected on the overlying card.

In the ensuing description, reference will be made to an example wherein operations of underlining letters are repeatedly used and executed on a plurality of files which have already been saved.

Figure 1B:
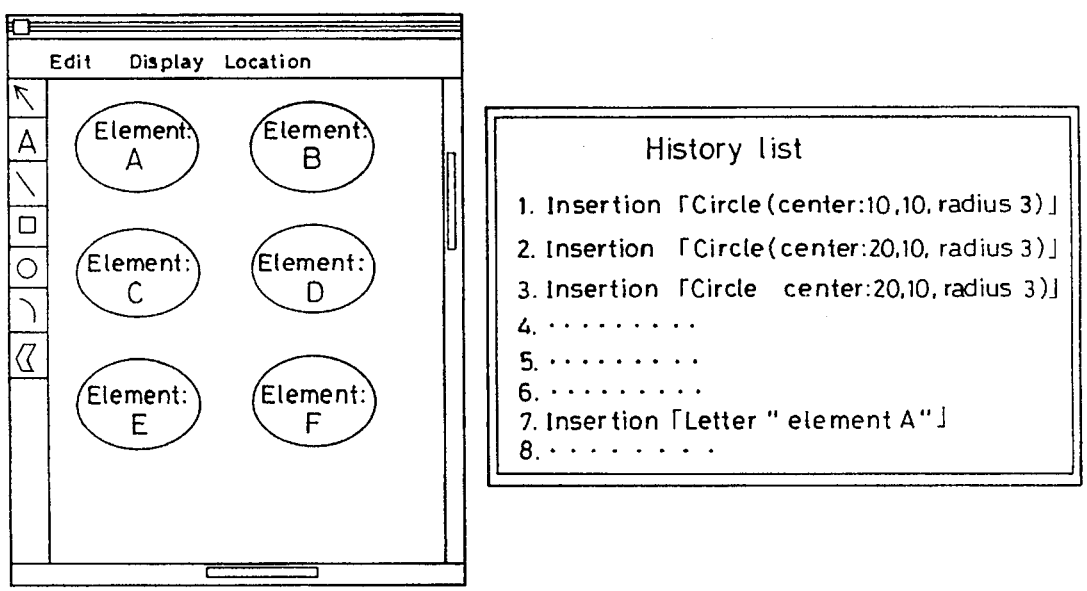
Figure 4A:
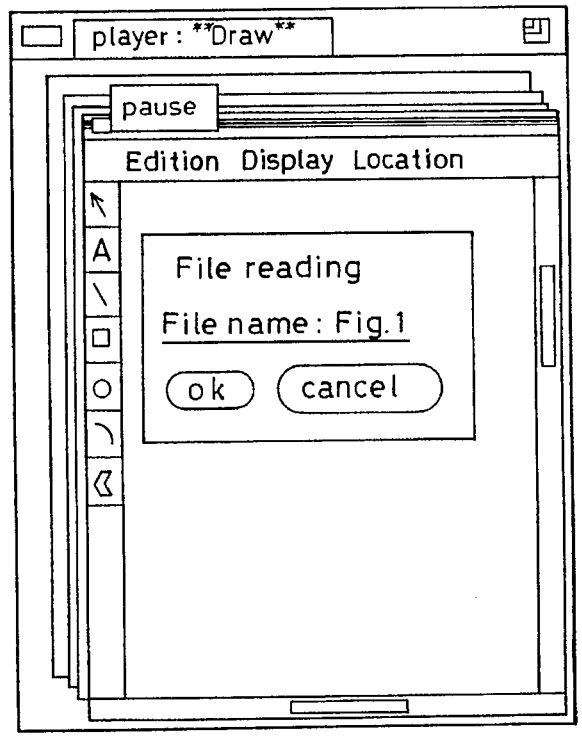
Figure 4B:
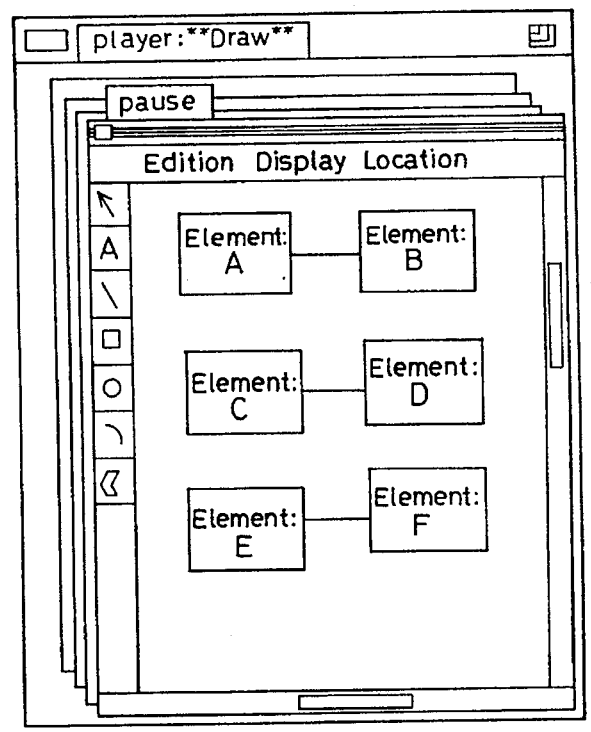
Figure 4C:
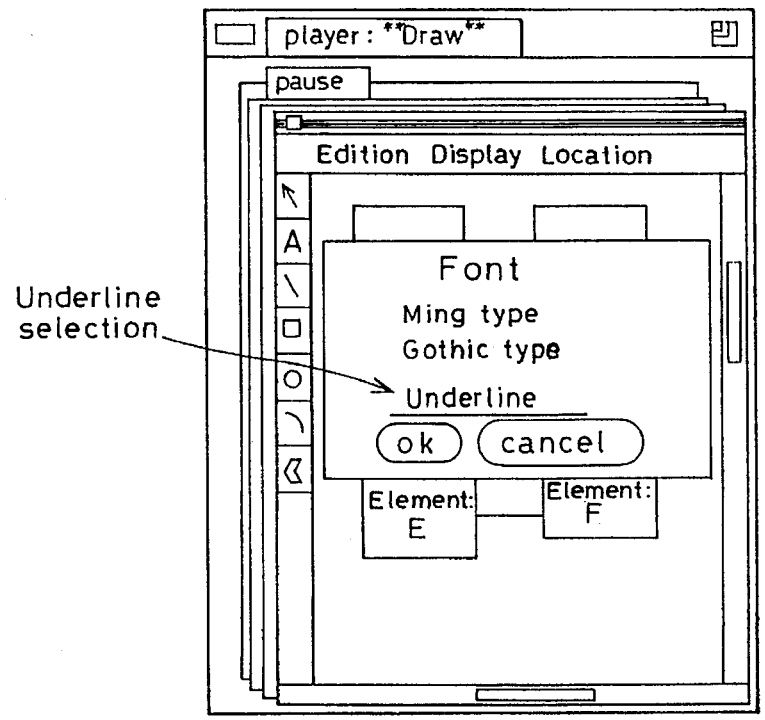
Figure 4D:
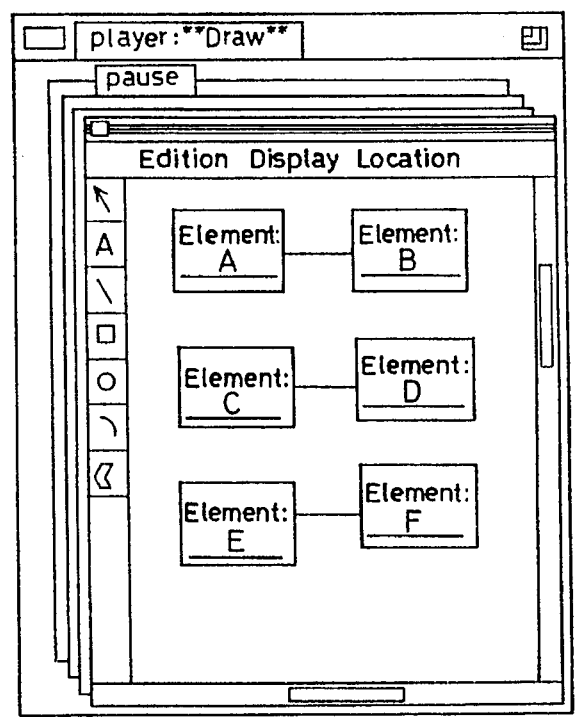
Figure 4E:
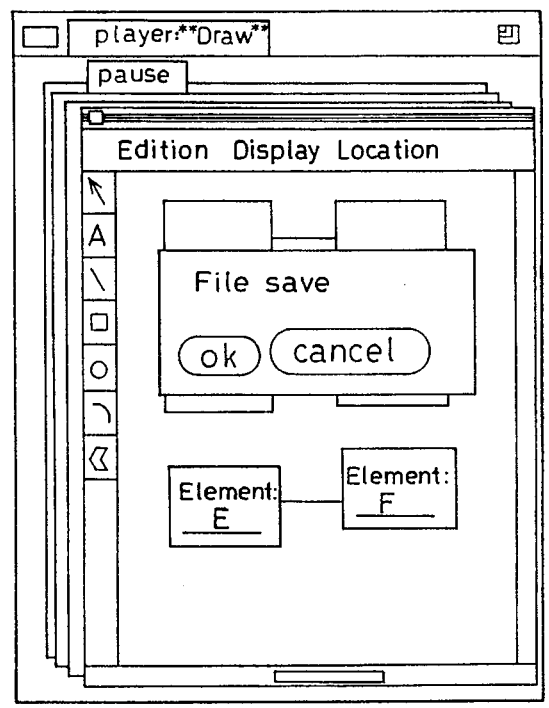
Figure 4E:
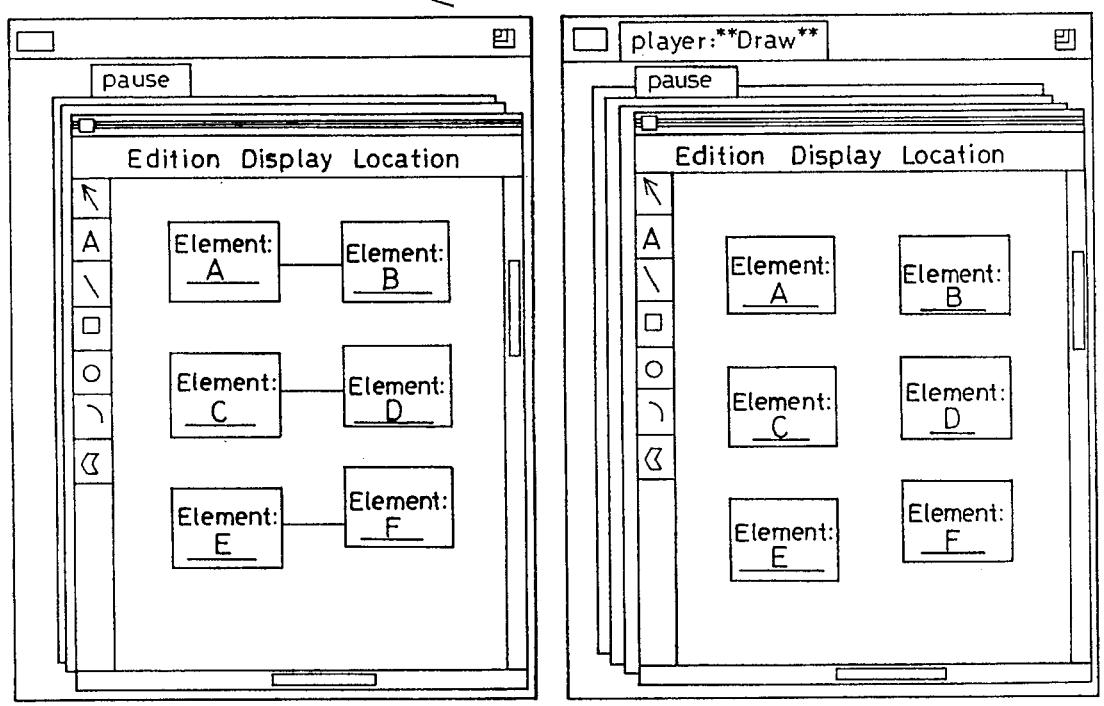
Figure 4G:
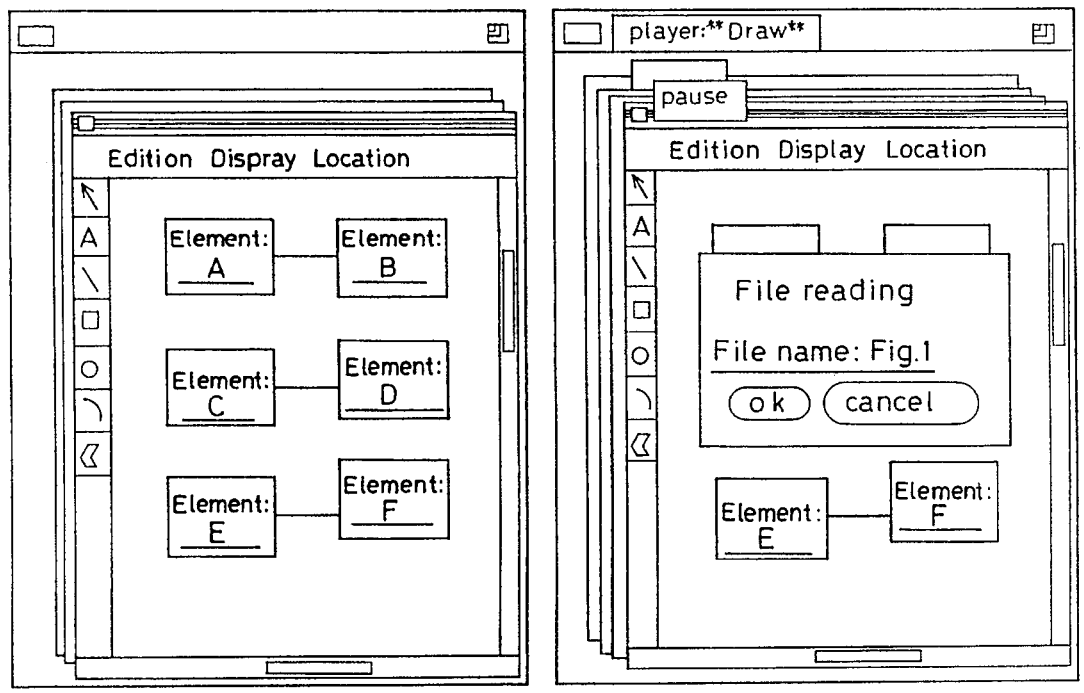

First, as the mouse cursor is moved over "Edition" in the pull-down menu area and clicked on, the edition menu appears, triggering file reading, as shown in FIG. 4A, typing "FIG. 1" as a file name and tagging the card with "Pause" through the history window menu. Then, as "OK" is clicked on, "FIG. 1" is read in, as shown in FIG. 4B. Subsequently, as shown in FIG. 4C, the underline is selected from the font menu, each letter is underlined, as shown in FIG. 4D and the menu "File Save" is accessed, as shown in FIG. 4E, for saving.

Figure 4H:
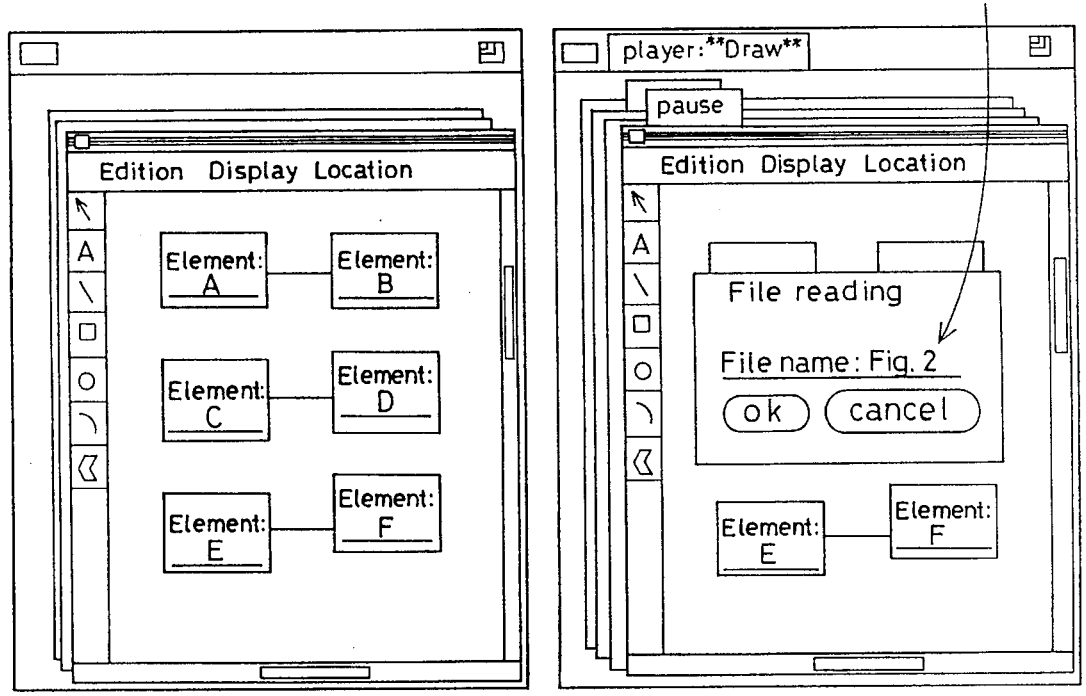
Figure 4I:
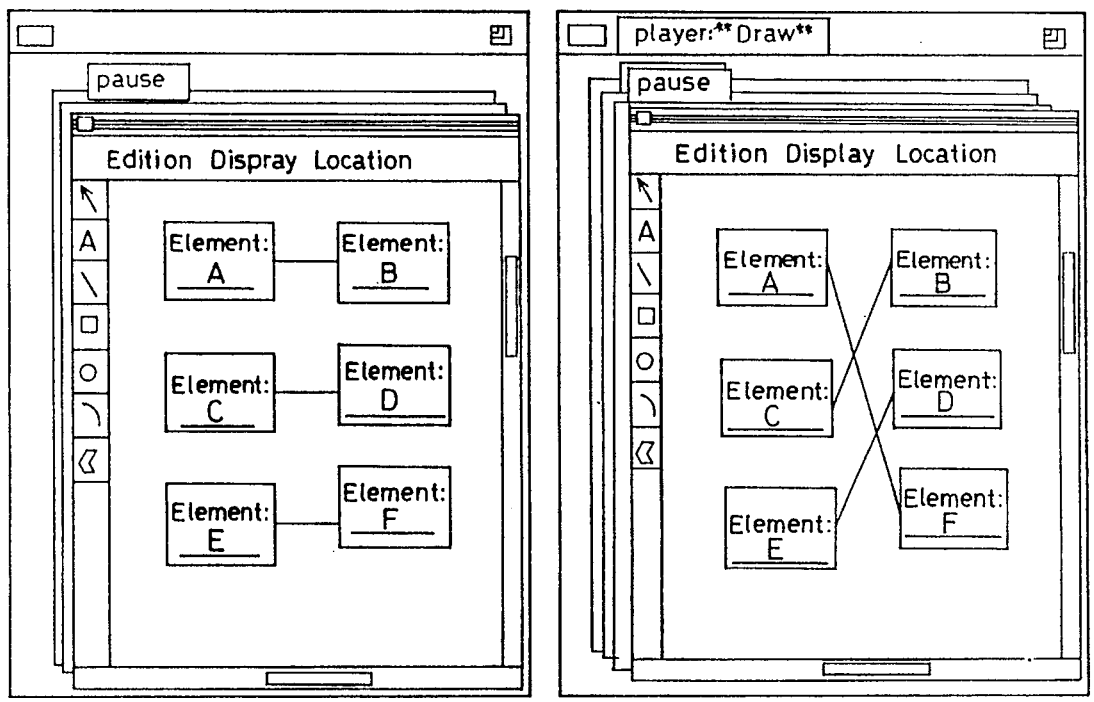

For the above operational histories to be used for "FIG. 2 and "FIG. 3" as well, all cards from the the card tagged with "Pause" to the leading card are copied in the history stack, as shown in FIG. 4F. As the stacks are put one upon the other and the operational histories corresponding to the card are inserted, pausing takes place at the card tagged with "Pause", as shown in FIG. 46. Then, as the insertion pause is released by changing the file name to "FIG. 2", as shown in FIG. 4H, the operational histories corresponding to the remaining cards are executed, as shown in FIG. 4I. Consequenctly, "FIG. 1" in which "Element: A" is connected to its adjacent "Element:B" is underlined, while "FIG. 2" in which "Element: A" is cross-connected to "Element:F" is underlined.

Figure 4J:
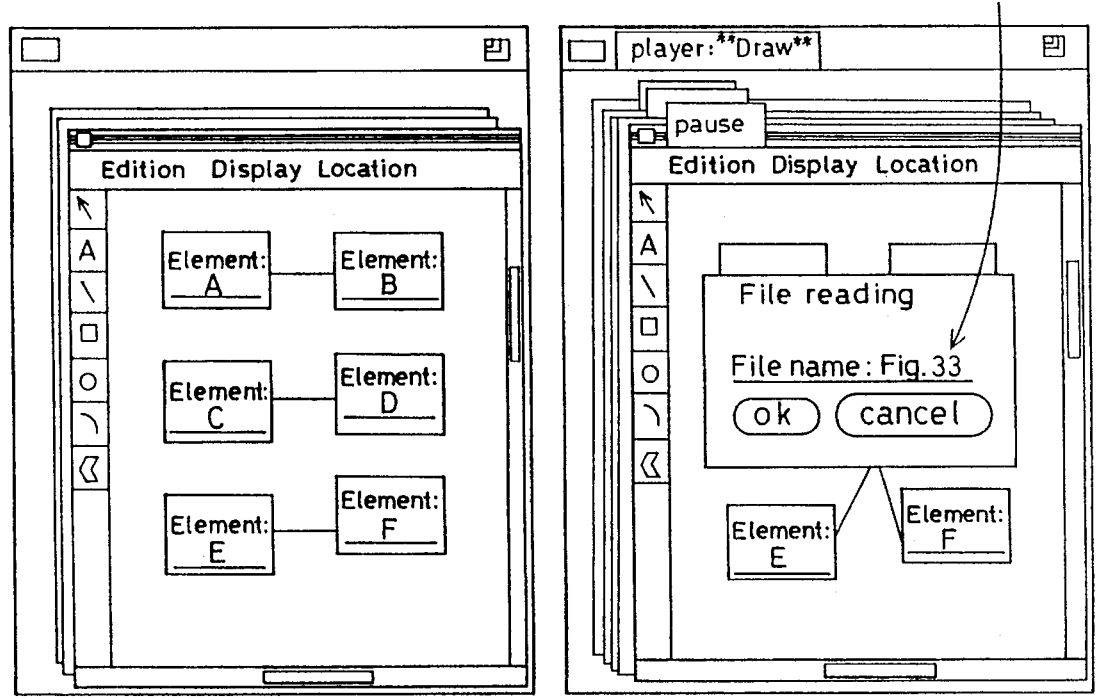
Figure 4K:
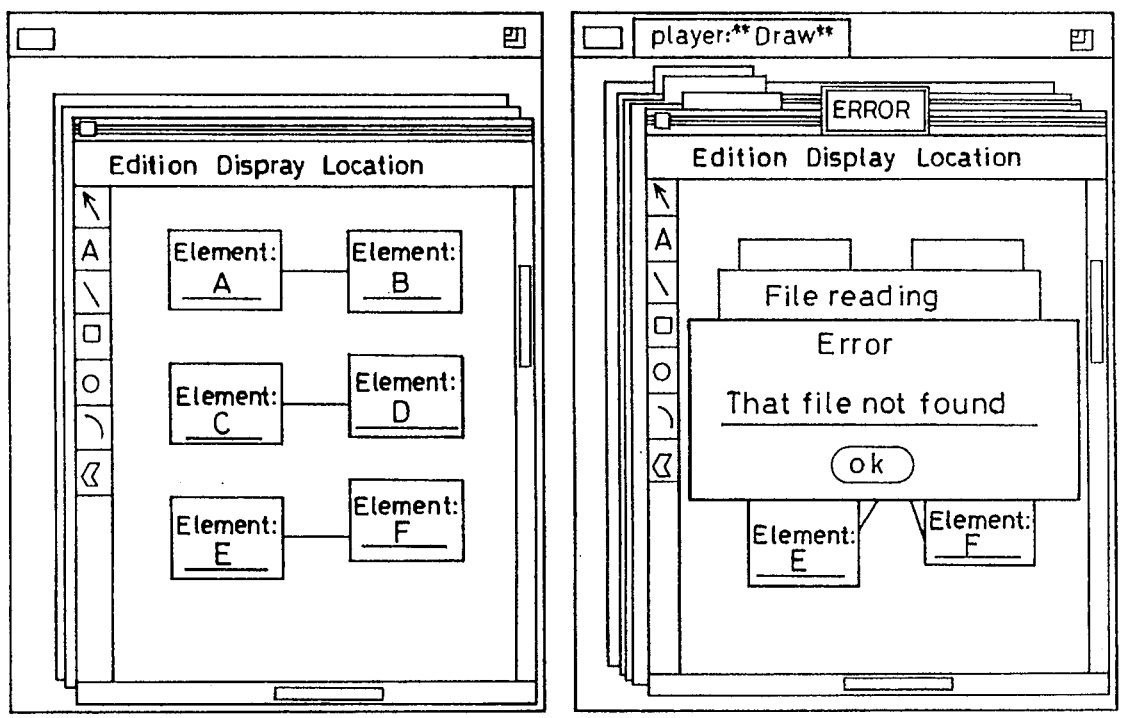
Figure 4L:
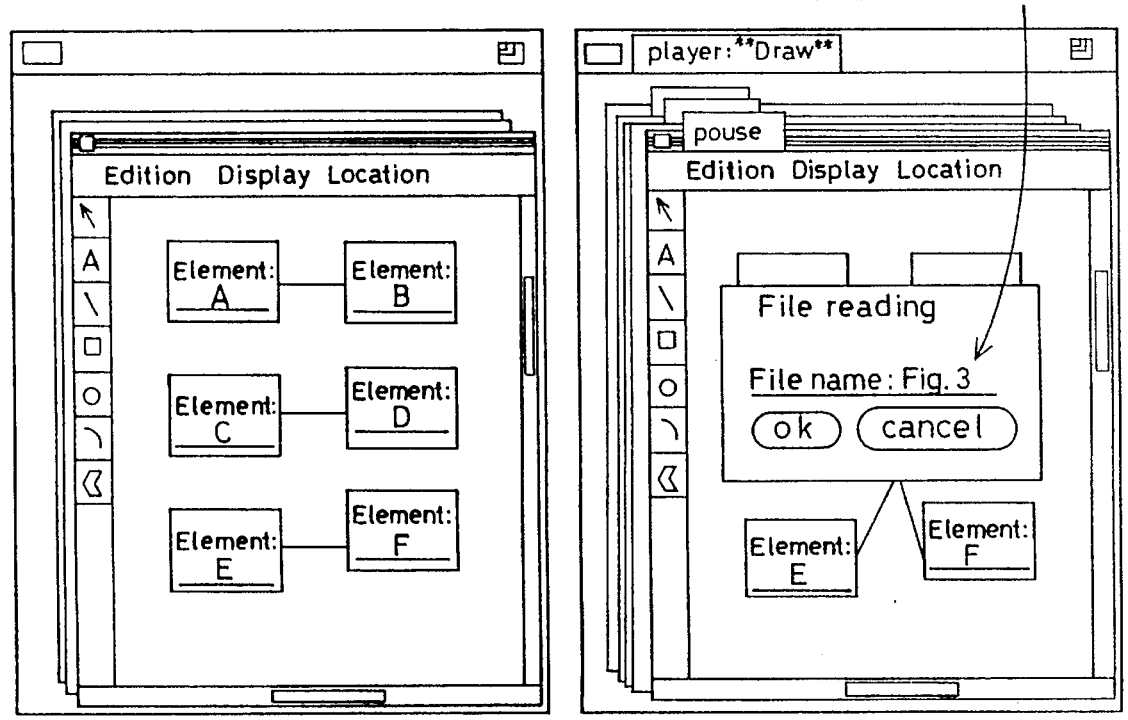

Then, consider the case where the stacks are put one upon the other and the operational histories corresponding to the cards are again inserted to perform similar operations on the file name of "FIG. 3". Here, assume that as shown in FIG. 4J, "FIG. 33" is accidentally typed in as the file name. Then, an error check message is sent out due to the absence of the indicated file name, as shown in FIG. 4K, providing the card with a message tag. In this case, the card corresponding to the accidentally inputted operation is deleted to change the file name to "FIG. 3", as shown in FIG. 4L, so that the operational histories can be used as well.

Figure 5:
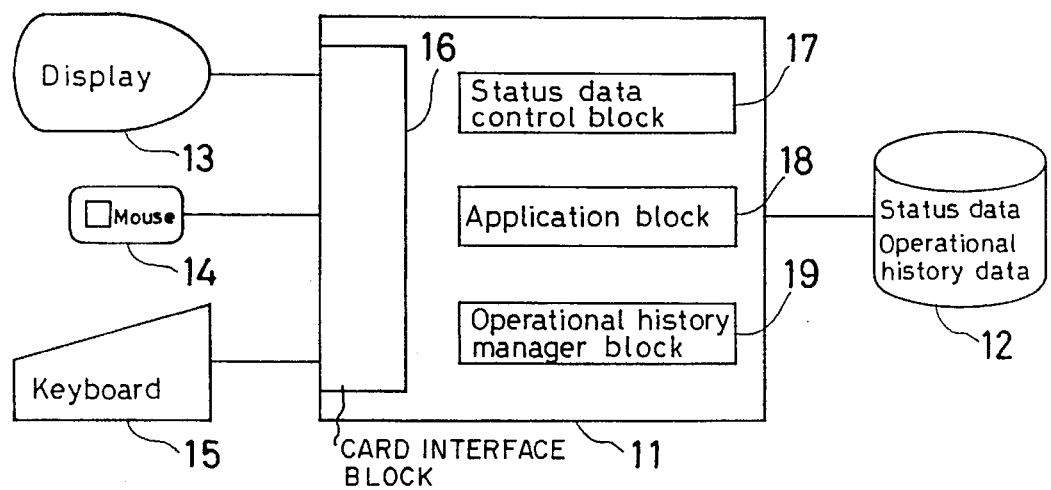
FIG. 5 is a block diagram of an embodiment of a system configuration in the history content representation system according to the present invention.

Referring now to FIG. 5, a data processor 11 includes a card type interface block 16, an application block 18, a status data management block 17 and an operational history management block 19, and is connected to a mouse 14 and a keyboard 15 with which the user sends commands, etc. to the system, a display 13 which presents-the user with input menus and processed results or other data, and a storage device 12 which stores processed data or other necessary data. As the user manipulates the mouse 14 or the keyboard 15, the data processor 11 interprets the operations done by the user to process the data; manages displays on the screen of the display 13; manages status data and operational history data stored in the storage device 12; and holds card representation data.

The card type interface block 16 in the data processor 11 interprets the user's operations to control each block; holds card representation data corresponding to histories; and manages representations displayed on the screen.

The application block 18 operates following the user's operations inputted through the card type interface block 16 and operation data coming from the operational history management block 19; and sends images displayed on the screen after its operation to the card type interface block 16.

The operational history management block 19 manages the data of the user's operational histories, and sends the operational history data to the application block 18 on demand from the card type interface block 16.

The status data management block 17 manages the status data required for reverting a current application back to any point in the past, and sends the status data to the application block 18 on demand from the card type interface block 16.

Figure 6A:
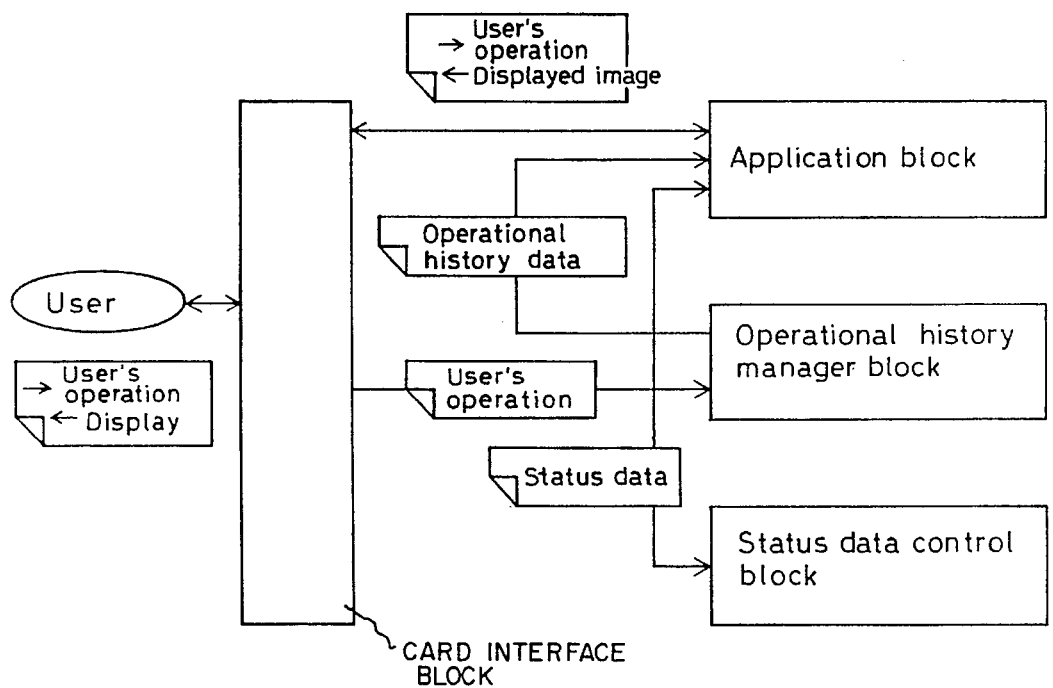
FIG. 6A through FIG. 6E are shown to explain the flow of the processes in the data processing system according to the present invention.
Figure 6B:
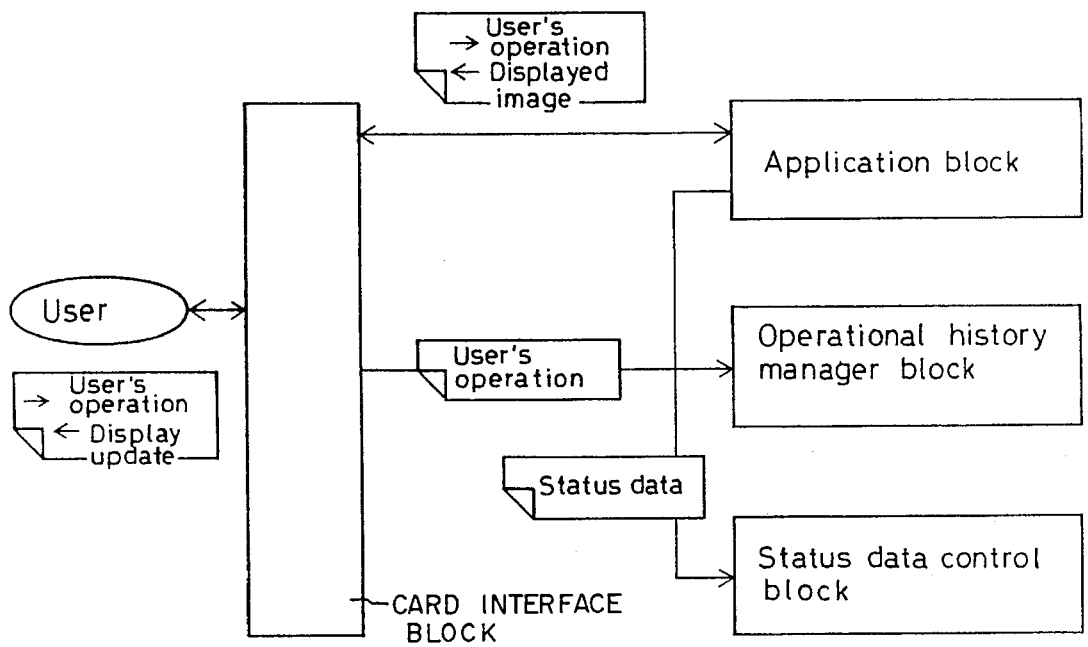

A processing through the data processor will now be explained with reference to FIGS. 6A through 6E. FIG. 6A represents flow of information between components of the data processing system, and a more detailed description is given below. When it operates normally, as shown in FIG. 6B, the user's operation data is sent from the card type interface block 16 to the application and operational history management blocks 18 and 19. Then, the image data displayed on the application block 18 is sent to the card type interface block 16, and the status data of the application is sent to the status data management block 17.

Figure 6C:
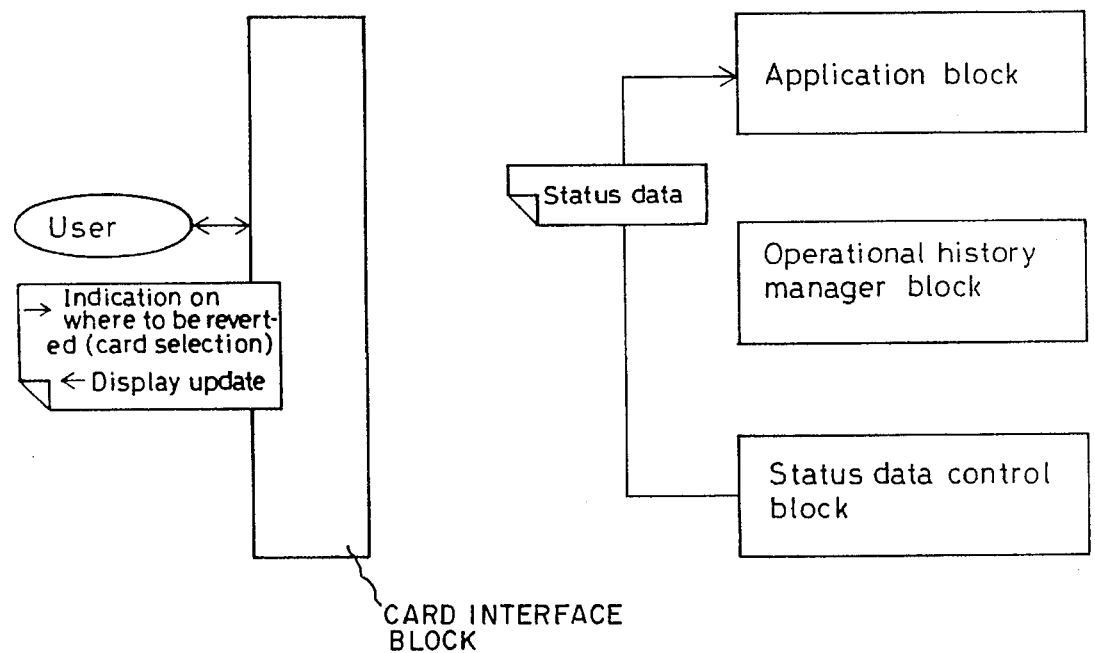

In order to revert the application back to any point in the past, control instruction data is sent from the card type interface block 16 to each block and the status data of the application is sent from the status data management block 17 to the application block 18, as shown in FIG. 6C.

Figure 6D:
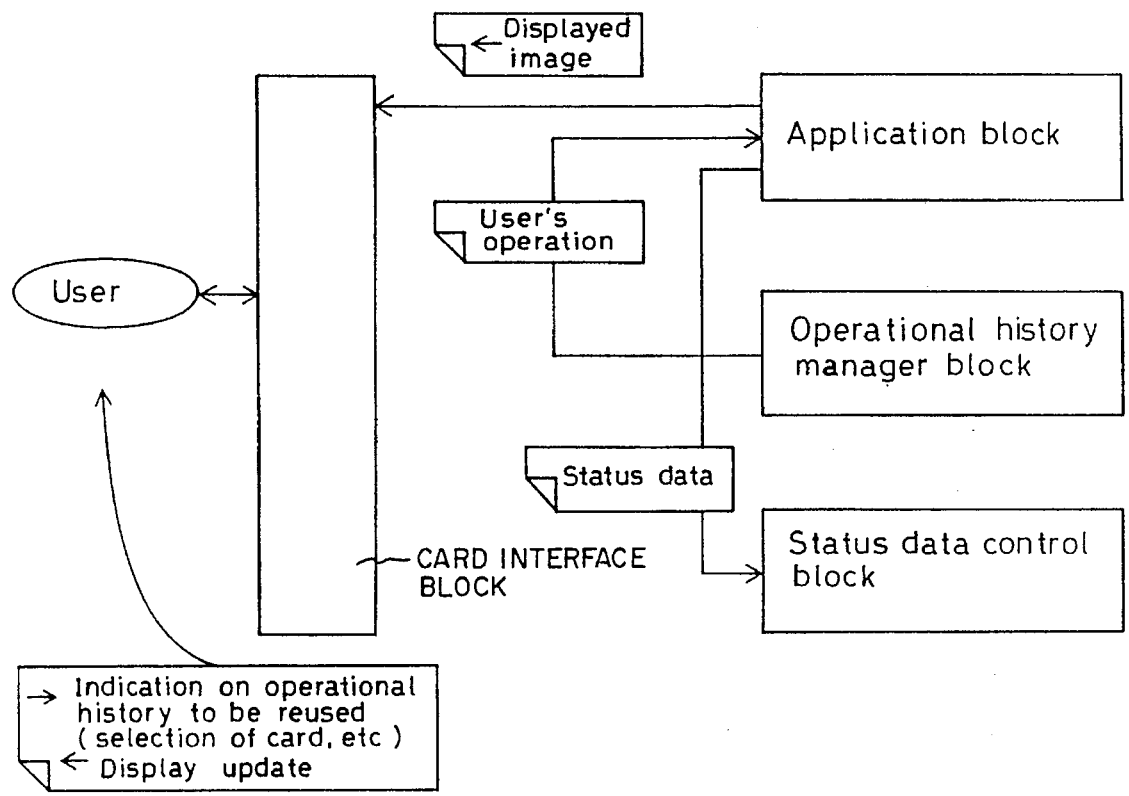

In order to give the operational history to the application, control instructions are sent from the card type interface block 16 to each block; and the operational history data is sent from the operational history management block 19 to the application block 18, as shown in FIG. 6D. In addition, the image data displayed on the application block 18 is sent from it to the card type interface block 16; and the status data of the application is sent to the status data management block 17.

Figure 6E:
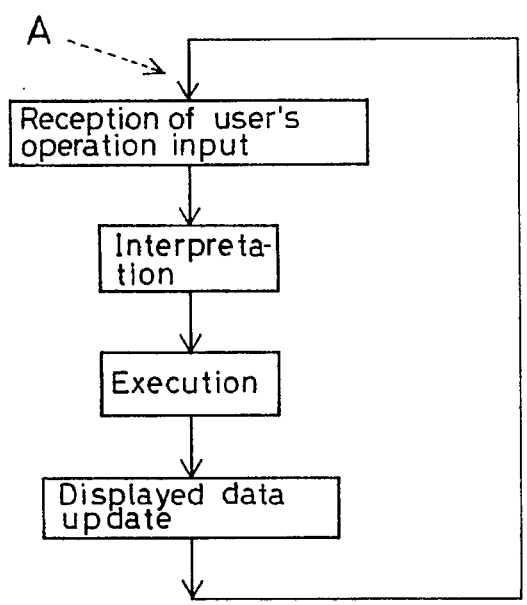

Referring to a processing flow through the application block 18, it receives, interprets and execute the user's operations and updates the data displayed, as can best be seen from FIG. 6E. Here, a value at a point of time A is regarded as the status data. Given this status data, the status data of the application block 18 is a set of data capable of reverting the application back to the point A. This status data is understood to include data of text, parameters or attribute data relating to text edition, flags and other data required for internal control of the application program, management data concerning computer resources, management data regarding display, and so on.

As has been explained above, according to the present invention wherein the user is presented with history data with visual objects (i.e., cards) appearing on the interface screen, it is possible for the user to have a ready understanding of the history contents and provide easy determination at to which point in the past the application is reverted back and in what order the operational histories are used. In addition, since the image displayed on the card is that the user saw through the application operations in the past and before-and-after flickering card representations allow the user to easily recognize and understand portions that change by the past flow of processing or operations and the contents of operations, the user can give the computer more pertinent instructions as to the operational history.

Managing the card bundle by the stacks makes it possible to perform operations on a plurality of operational histories and thus makes it easy to reuse the operational histories. In addition, tagging the cards makes it easy to have access to the desired card in the card bundle or rearrange the card bundle. Besides, when the user reuses a plurality of operational histories and inputs them to an application, the user can use the tag to give the computer an input pause command; thereby, inputting to the application an operation different from the reused operational histories. Thus, not only can a simple operational history be reused, but also the operational history and a user's new operation can be given to the application, thereby enabling the user to use the operational history more flexibly.

When reusing a plurality of operational histories and inputting them to the application, an exclusive tag corresponding to an application output message is provided to the card. This makes it easy for the user to confirm the message from the application. For example, when it is required to have the user confirm whether or not the application is to be continued, the application pauses the inputting of the operational history thereto, informing the user of the content, so that the user can confirm it and perform pertinent input operation on the application. This makes it easy to guide the application to the result demanded by the user. Thus, even when wrong operational history is inserted in reusing the operational history, it is easy to correct that error and obtain the desired result.

Since the system manages status data and operational history data, it is possible to revert the application back to any point in the past and input the operations inputted by the user in the past to the application.

While the invention has been particularly shown and described in reference to preferred embodiments thereof, it will be understood by those skilled in the art that changes in form and details may be made therein without departing from the spirit and scope of the invention.

What is claimed is:

1. A history content representation system for use in information processors, comprising:
   means for managing at least one of an operational history data and a status data to revert an application back to any desired point in the past or to make use of past operations;
   an interface screen having cards as objects for manipulation by a user to use the past operations, wherein contents of said cards represent the past operations, and wherein an order of said cards corresponds to time series of the past operation, and wherein the screen, which displays a card representation, displays images which alternatively display simultaneous screen representations before and after a change in an application of the screen, the change in the application of the screen being performed by the user at any point in the past operations; and
   a stack of cards which cooperates with an application by the user, wherein an application executes past operations corresponding to a card sequence on said stack of cards, wherein results of the application which has been executed are represented on said cards.

2. A history content representation system as claimed in claim 1, wherein a card representation is provided on the interface screen for application by the user at any point in the past operations.

3. A history content representation system as claimed in claim 1, wherein the before-change representation differs from the after-change representation in terms of a length of time.

4. A history content representation system as claimed in claim 1, wherein an indicator provided for the card is incorporated in the interface screen.

5. A history content representation system as claimed in claim 1, wherein an objective within a stack of cards, which is a location where a bundle of cards arranged according to a time series of a card history is placed and to which instructions as to a user's operation on said card bundle are inputted, is displayed on the user's interface screen.

6. A history content representation system as claimed in claim 1, wherein the card sequence is inserted into the stack of cards in conjunction with the application for allowing the application to execute the past operations.

7. A history content representation system as claimed in claim 6, further comprising an indicator for pausing the execution of the past operations corresponding to a card.

8. A history content representation system as claimed in claim 6, further comprising an indicator means for pausing the execution of the past operations with a card corresponding to a point in time in which an error or warning message is sent from the application so as to indicate that there has been message outputted from the application.

9. A history content representation system for use in information processors, comprising:
   means for managing at least one of an operational history data and a status data to revert an application back to any desired point in the past or to make use of the past operations;
   a card type interface block means for interpreting a user's operation to control each block, holding card representation data corresponding to past operations and managing representations displayed on a screen;
   a status data management block means for managing the status data required for reverting the application back to any of the past operations;
   an operational history management block means for managing a user's operational history data;
   an application block which operates according to the user's operation inputted through said card type interface block means and the operational history data from said operational history management block means and outputs an image after an operation of said card type interface block means, wherein the interface screen of said interface block means has cards as objects for manipulation by the user to use the past operations, wherein contents of said cards represent the past operations, and wherein an order of said cards corresponds to a time series of past operations, and wherein the screen, which displays a card representation, displays images which alternatively display simultaneous screen representations before and after a change in an application of the screen, the change in the application of the screen being performed by the user at any point in the past operations; and
   a stack of cards which cooperates with an application by the user, wherein an application executes past operations corresponding to a card sequence on said stack of cards, wherein results of the application which has been executed are represented on said cards.

* * * * *